M. H. PRESTON.
GASOLENE INDICATOR.
APPLICATION FILED APR. 17, 1909.
952,356.
Patented Mar. 15, 1910.
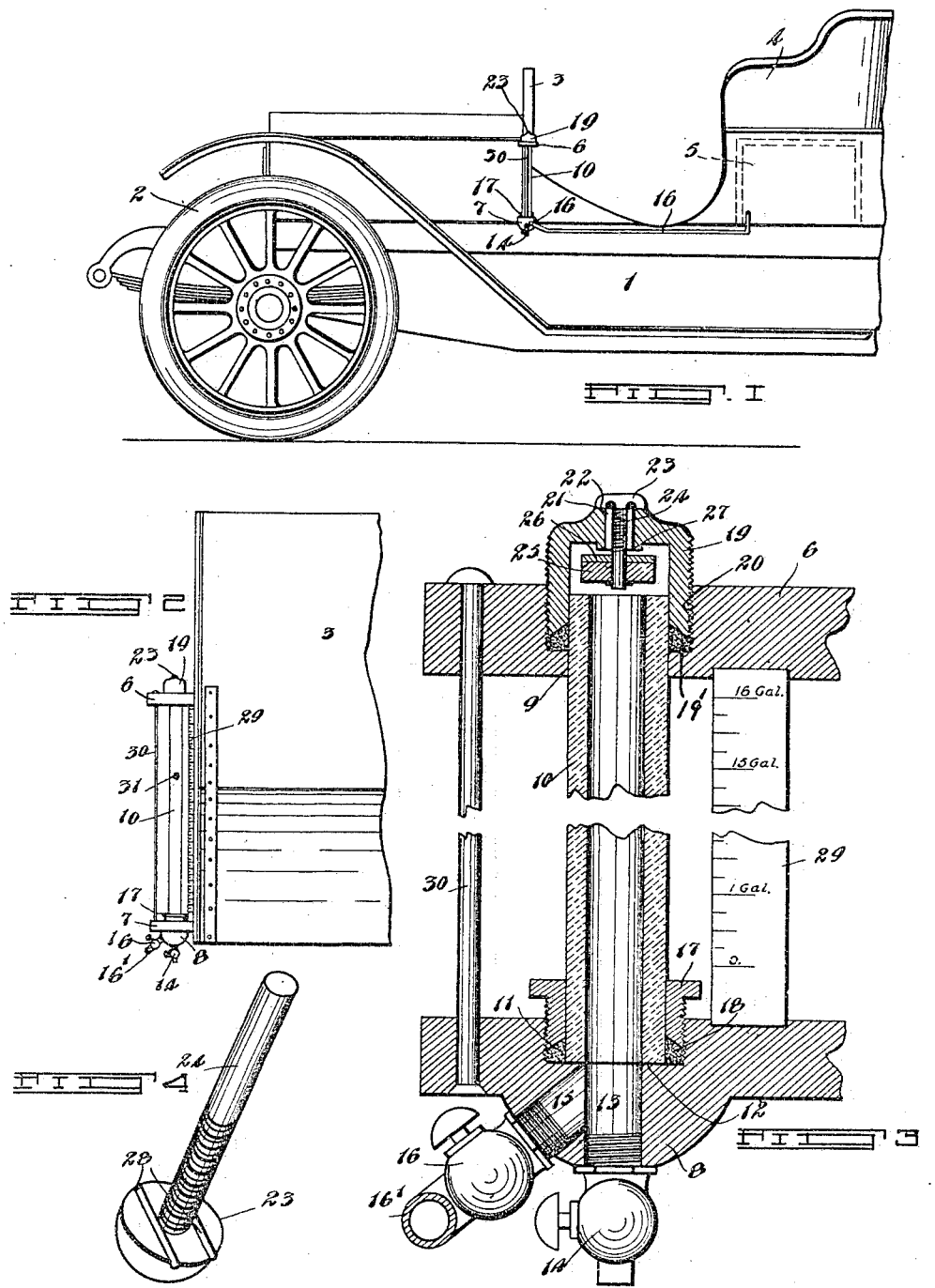
WITNESSES
G. Thomson.
Jas. M. Tapley
INVENTOR
Myrta H. Preston
By Fred B. Fahnestock
His Atty.

UNITED STATES PATENT OFFICE.

MYRTA HELEN PRESTON, OF WINNIPEG, MANITOBA, CANADA.

GASOLENE-INDICATOR.

952,356.  Specification of Letters Patent.  Patented Mar. 15, 1910.

Application filed April 17, 1909. Serial No. 490,576.

*To all whom it may concern:*

Be it known that I, MYRTA HELEN PRESTON, of the city of Winnipeg, in the Province of Manitoba, Canada, have invented certain new and useful Improvements in Gasolene-Indicators, of which the following is the specification.

My invention relates to an indicator particularly adapted for use in connection with automobiles, motor boats, and other such machines wherein gasolene or a similar liquid is used as an explosive, and the object of the invention is to provide a device by which it is possible for the party operating the machine to be constantly aware of the amount of gasolene carried by the machine in its tank, thereby preventing the possibility of running out of the liquid before reaching the destination.

It consists essentially in a suitably supported transparent tube appearing within visual range of an operator or driver, means connecting the tube with the gasolene supply tank, suitable stop cocks for draining the tube and for cutting off the connection from the tank, a valve at the upper end of the tube, and a graduated scale adjoining the tube, the parts being arranged and constructed as hereinafter more particularly described.

Figure 1 represents a side elevation of the front portion of an automobile showing one manner in which my indicator can be applied. Fig. 2 represents a front elevation of a portion of the dash board of an automobile showing the indicator attached. Fig. 3 is an enlarged detailed sectional view through the indicator and its supporting brackets, certain parts being shown in side elevation. Fig. 4 is an enlarged detailed perspective view of the valve stem.

In the drawings like characters of reference indicate corresponding parts in each figure.

1 represents the ordinary automobile frame supported upon the usual wheels, only the forward ones 2 being shown.

3 represents the dash board and 4 the front seat, it being understood that the gasolene supply tank 5 appears as is usual directly beneath the seat.

6 and 7 represent brackets or arms secured at their inner ends in any desirable manner to the dash board 3. The lower bracket 7 is supplied with an enlargement at 8 and the upper bracket is provided with a vertically directed opening 9 which receives snugly the glass tube 10. The lower end of the tube rests on the bracket 7 which is cored out at 11 thereby forming a ledge at 12 on which the tube bears. An opening 13 continuous with the bore of the tube passes through the enlargement 8 of the bracket and is closed by a stop cock 14 so that the tube can be drained when desired by opening the stop cock valve.

15 is a duct leading from the opening or duct 13 and closed by a second stop cock 16 which is connected with a pipe 16' which leads directly to the bottom of the gasolene tank.

17 is a stuffing box adapted to receive the lower end of the tube 10 and to screw into the bracket 7.

18 is packing material of any kind inserted directly beneath the packing box 17 in such a manner that when the packing box is screwed down it presses the packing material tightly against the lower end of the tube thereby preventing any leakage of gasolene from the tube.

19 is a cap screw designed to screw to the bracket 6, the bracket being recessed at 20 to receive it and the end of the tube which passes upwardly through the opening 9.

19' is packing material of any suitable kind located around the tube directly beneath the cap screw 19 in such a manner that when the cap screw is tightened or screwed down the packing material is pressed tightly against the upper end of the tube thereby preventing the leakage of gasolene. The cap screw is provided with a vertically directed opening 21 axially alined with the tube and has its upper side faced at 22 to receive the head 23 of the threaded valve stem 24 which passes downwardly through the opening.

25 is a cork or other such like substance secured to the lower end of the stem 24 and forming a float valve.

26 is a metallic plate in the form of a washer located on the stem and directly above the cork. The cork and plate are in this way housed within the cap screw directly above the upper end of the tube. The interior of the cap screw is faced at 27 so that when the plate rests against it a closed joint is made between these two parts. The head 23 is provided with a set of transverse channels 28 which are designed to allow the air and gasolene vapors to pass to and from the interior of the cap.

29 is a graduated scale located immediately to the side of the tube 10 and graduated so that it indicates according to the height of liquid in the tube the number of gallons or fraction thereof in the tube. It is of course to be understood that the level of the indicator has to be such that when there is one gallon of gasolene in the tank the level of the gasolene in the tank indicates one gallon on the scale.

The object of the float valve is now described.

When a machine is running on level ground the gasolene and air are free to pass upwardly through the opening 21 and channels 28. If the tank be fairly well filled with gasolene and the machine run up or down an inclined roadway the gasolene rises in the tube 10, and would if the valve were not provided leak out and be in this way wasted. However with this indicator as soon as the gasolene passes higher than desired it carries the float valve upwardly with it the valve closing over the opening 21. As soon as the liquid subsides again the valve drops owing to the weight of the plate 26, and again allows the vapors and air to pass off.

The channels 28 are provided on the under face of the head so that there is small possibility of foreign substance accumulating and closing the opening 21. The stem 24 is threaded so as to cut away any foreign substance that might get into the opening 22.

30 is a rod connecting the outer ends of the brackets 6 and 7 and forms a guard for the tube 10.

I have found it desirable to place a ball 31 in the tube 10 such ball being highly colored and adapted to float on the liquid in the tube so that the height of the gasolene can be readily ascertained.

I have constructed the various portions in such a manner that they can be readily taken apart and renewed, and have taken particular care to construct the cap screw, brackets, and packing box in a manner so that a glass can be readily removed in event of breakage and a new one substituted.

What I claim as my invention is:

1. In an indicator of the class described, the combination with the liquid supply tank, of a vertically extending transparent tube, supporting brackets therefor, the lower of said brackets having an enlargement thereon; said enlargement having ducts therein communicating with the interior of the tube at the bottom, stop cocks for said ducts, one of said stop cocks being connected with the supply tank; a cap screw closing over the upper end of the tube and having a vertically directed opening passing therethrough; a float valve housed by the cap screw said valve having a shank passing upwardly freely through the opening in the cap screw, and provided with an enlarged head, the head normally closing over the opening, there being cross channels within the head communicating with the opening, said valve being adapted to seat on the inner face of the cap screw to close the opening, as and for the purpose specified.

2. In an indicator of the class described, the combination with the liquid supply tank, of a vertically directed transparent tube, an upper and a lower supporting bracket therefor, the lower of the brackets being provided with an enlargement, and having a portion thereof cored out to receive the end of the tube, and the upper of the brackets having a vertically directed opening therein through which the tube passes; means connecting the lower end of the tube with the supply tank; a stuffing box adapted to receive the lower end of the tube and to screw into the lower bracket; a cap screw adapted to receive the upper end of the tube and to screw into the upper of the brackets, there being a suitable packing material located around the tube and beneath the cap screw and the stuffing box said cap having an opening therein; a float valve carried by the cap screw and having a shank passing upwardly through the opening provided in the cap, the said valve in the normal position being adapted to admit air to and allow the escape of vapor from the tube, and to be seated on the inner face of the screw when floated by the liquid in the tube, as and for the purpose specified.

Signed at Winnipeg, in the Province of Manitoba, this 29th day of March 1909.

MYRTA HELEN PRESTON.

Witnesses:
G. S. ROXBURGH,
M. A. SOMERVILLE.